(12) United States Patent
Sherman et al.

(10) Patent No.: US 10,035,089 B2
(45) Date of Patent: *Jul. 31, 2018

(54) FILTRATION SYSTEM

(71) Applicant: KX Technologies LLC, West Haven, CT (US)

(72) Inventors: Michael J. Sherman, Woodbury, MN (US); Lori Foix, Inver Grove Heights, MN (US); Steven J. Haehn, Oakdale, MN (US); Erik R. Klimpel, Woodbury, MN (US); David William Fisher, Eagan, MN (US); David T. Bardwell, Woodbury, MN (US); Steven K. Wilson, Pine City, MN (US); James B. Larson, Stillwater, MN (US); Stephen P. Huda, Shelton, CT (US); Frank A. Brigano, Northford, CT (US)

(73) Assignee: KX Technologies LLC, West Haven, CT (US)

(*) Notice: Subject to any disclaimer, the term of this patent is extended or adjusted under 35 U.S.C. 154(b) by 249 days.

This patent is subject to a terminal disclaimer.

(21) Appl. No.: 15/089,963

(22) Filed: Apr. 4, 2016

(65) Prior Publication Data

US 2016/0214042 A1 Jul. 28, 2016

Related U.S. Application Data

(60) Continuation of application No. 14/582,647, filed on Dec. 24, 2014, which is a division of application No.
(Continued)

(51) Int. Cl.
*B01D 35/30* (2006.01)
*B01D 27/00* (2006.01)
(Continued)

(52) U.S. Cl.
CPC .......... *B01D 35/147* (2013.01); *B01D 35/30* (2013.01); *C02F 1/003* (2013.01); *F16K 17/36* (2013.01);
(Continued)

(58) Field of Classification Search
CPC .................. B01D 35/153; B01D 35/30; B01D 2201/302; B01D 35/147; B01D 2201/305;
(Continued)

(56) References Cited

U.S. PATENT DOCUMENTS

| | | |
|---|---|---|
| 3,055,503 A | 9/1962 | Chauncey |
| 3,828,932 A | 8/1974 | Schneer |

(Continued)

FOREIGN PATENT DOCUMENTS

| | | |
|---|---|---|
| DE | 10 2008 002 727 | 12/2009 |
| GB | 2477942 A | 8/2011 |

(Continued)

*Primary Examiner* — Claire A Norris
(74) *Attorney, Agent, or Firm* — DeLio, Peterson & Curcio, LLC; Robert Curcio

(57) ABSTRACT

The present invention presents a filtration system with an integrated manifold valve. The filtration system employs only one pivotal component—the pivoting of the manifold. The manifold valve includes a dual aperture design for a two-fold alignment scheme with the ingress and egress lines of the fluid source. The invention is free of multi-component rotary valve with internal, rotatable parts, or an activation component, such as a handle, for initiating the rotary valve, allowing the user to rotate the rotational components thereof. The reduction in moveable components in this design reduces the likelihood of failure and increases the reliability of the filtration system.

7 Claims, 14 Drawing Sheets

Related U.S. Application Data

13/422,657, filed on Mar. 16, 2012, now Pat. No. 8,945,383.

(51) Int. Cl.
*B01D 35/147* (2006.01)
*C02F 1/00* (2006.01)
*F16K 17/36* (2006.01)

(52) U.S. Cl.
CPC .. *B01D 2201/302* (2013.01); *B01D 2201/307* (2013.01); *B01D 2201/308* (2013.01); *C02F 2201/006* (2013.01)

(58) Field of Classification Search
CPC ... B01D 2201/34; C02F 1/003; F16K 11/078; F16K 17/36
USPC .......................................................... 210/263
See application file for complete search history.

(56) References Cited

U.S. PATENT DOCUMENTS

| | | |
|---|---|---|
| 5,022,986 A | 6/1991 | Lang |
| 5,118,418 A | 6/1992 | Roussel |
| 5,376,271 A | 12/1994 | Morgan, Jr. |
| 5,626,746 A | 5/1997 | Rose |
| 5,914,037 A | 6/1999 | Yen |
| 6,193,884 B1 | 2/2001 | Magnusson et al. |
| 6,460,564 B1 | 10/2002 | Rief et al. |
| 7,056,436 B2 | 6/2006 | Stankowski et al. |
| 7,387,210 B2 | 6/2008 | Burrows et al. |
| 7,407,148 B2 | 8/2008 | Bassett et al. |
| 7,651,070 B2 | 1/2010 | Ruprecht |
| 7,763,170 B2 | 7/2010 | Bassett et al. |
| 7,850,845 B2 | 12/2010 | Wiczorek et al. |
| 7,926,666 B2 | 4/2011 | Herman et al. |
| 2005/0103697 A1 | 5/2005 | Magnusson et al. |
| 2006/0000754 A1 | 1/2006 | Kang et al. |
| 2006/0070942 A1 | 4/2006 | An |
| 2007/0284296 A1 | 12/2007 | Swain et al. |
| 2008/0047889 A1 | 2/2008 | Huda |
| 2009/0236271 A1 | 9/2009 | Eserkaln et al. |
| 2010/0116730 A1 | 5/2010 | Mitchell |
| 2011/0024344 A1 | 2/2011 | Thomas et al. |
| 2011/0247974 A1 | 10/2011 | Gale et al. |
| 2012/0031821 A1 | 2/2012 | Swain |

FOREIGN PATENT DOCUMENTS

| | | |
|---|---|---|
| WO | 00/04973 A1 | 2/2000 |
| WO | 2012024128 A1 | 2/2012 |

FILTRATION SYSTEM

BACKGROUND OF THE INVENTION

1. Field of the Invention

This invention relates generally to water filtration systems combining at least one filter cartridge with a manifold, and more specifically to a water filtration system of the type having removable cartridges, while sustaining water flow during filter cartridge replacement. More particularly, this invention relates to a home water filtration system having filter cartridges designed for replacement without water spillage, and without removing or ceasing water flow to the household during filter replacement. The water filtration system is designed for enhanced reliability through the reduction of moving components to perform the aforementioned attributes.

2. Description of Related Art

As evidence by reference to the prior art, it is known heretofore to employ a valve in water filtration systems to facilitate the removal and changing of filter cartridges. If the filtration system is designed to have a bypass feature, where the fluid flow from the source to the endpoint remains uninterrupted during filter cartridge replacement, the valve must be capable of providing at least two distinct flow paths. The first, when a filter cartridge is secured within the manifold, and fluid is directed from the fluid source to the manifold, through the cartridge for filtration, and out the manifold to its destination; and the second during cartridge replacement when it is desirable for the fluid to either cease or flow directly from the fluid source to and through the manifold, bypassing the (removed) filter cartridge, and out the manifold to its destination.

Furthermore, it is generally desirable for the manifold-cartridge interface to be sealed from unwanted leakage or dripping during filter cartridge removal. It is desirable for the removal of the cartridge to be a simple process that can be achieved quickly and efficiently by the end user, typically an untrained person. Solutions to this problem have been unsatisfactory, insomuch as these desired functions have introduced complexity in the filtration system manifold and cartridge designs, added to the count of component parts, increased manufacturing costs, and decreased product reliability due in part to the addition of multiple moving parts.

Although the prior art has attempted to address these concerns, there remain deficiencies in implementation that implore another approach. For example, in U.S. Pat. No. 6,460,564 issued to Rief, et al., on Oct. 8, 2002, entitled "AUTOMATIC-LOCKING SHUT-OFF VALVE FOR LIQUID SUCTION SYSTEMS," a rotary shut-off valve is taught having an actuator housing, a base member, a vacuum-reactive member, a spring, and a piston. The actuator housing is affixed to the valve body adjacent to the plug, and forms an actuator chamber which is in fluid communication with the valve chamber. The base member is affixed to the actuator housing in position to form one end of the actuator chamber. The base member also forms: (1) a sleeve through which a portion of the piston extends; (2) a guide which engages a portion of the piston; and (3) a first spring-abutment. Once the shut-off valve is activated, it requires manual resetting by returning a reset/override lever to the ready position. This design is component intensive, and there is no bypass configuration when implementing this rotary valve.

In U.S. Patent Publication No. 2011/0247974 published for Gale, et al., on Oct. 13, 2011, entitled, "FILTRATION SYSTEM," a filtration system is disclosed that includes a filter manifold and a filter cartridge. The filter manifold comprises a bracket, a handle-activated multi-component valve, a manifold feed port, and a manifold filtrate port. A multi-component rotary valve is held by the bracket and comprises a fixed portion attached to the bracket and a rotary portion. Importantly, the handle is operatively connected to the rotary portion of the valve and includes a cartridge lifter to lift and secure the cartridge to the manifold upon rotation of the handle. The cartridge lifter has a camming ramp or a camming lug lifter engagement feature. The handle is rotatable to a filtration position and a disengaged, service or replacement position. The manifold feed port is blocked by the valve when the handle is in the disengaged position. The filter cartridge has an external cartridge surface having one of a camming lug or a camming ramp for engaging the lifter engagement feature.

The rotary portion of the design of U.S. Patent Publication No. 2011/0247974 is a multi-component design, having a two-part shell with first and second cylindrical portions. The first cylindrical portion identifies a feed channel. The second cylindrical portion identifies a filtrate channel. The first cylindrical portion and the second cylindrical portion each comprise a portion of a bypass channel. The bypass channel fluidly connects the feed water source to the filtrate outlet of filter manifold when the rotary portion is in the locked position. When the handle is rotated, the rotary portion of the valve is engaged and rotates. Additionally, when the handle is rotated, a cartridge lifter engages a compatible feature on the filter cartridge, thereby lifting the filter cartridge from a cartridge support shelf and drawing the filter cartridge towards the filter manifold. To disengage the water source and replace the cartridge, the rotary portion of the valve is activated by the handle. The handle moves upward while the cartridge remains in the vertical position. Functionally, this design attempts to provide a diversion or bypass for the ingress water when the handle is moved from the downward (filtration) position, to the upward (service) position.

The handle of the design of U.S. Patent Publication No. 2011/0247974 is attached to the manifold, which holds the rotary valve. The handle connects specifically to the end of the rotary portions of the valve. As the handle is rotated, the rotary portion of the valve is rotated; however, the filter cartridge always remains in its configured (filter) position, that is, in the vertical position. The handle rotation and rotary valve rotation do not rotate the filter cartridge.

The multi-component valve having the rotary portion of the valve nested within a fixed portion, and being responsive only to the rotation of a separate handle, requires additional components, adds additional complexity for manufacturing, and reduces the filtration system's reliability. Furthermore, with the filter cartridge remaining in its configured (filter) position when the handle is activated (moved upwards), the only indication that the water is not being filtered, i.e., that the system is in bypass mode, is the positioning of the handle, which could ultimately mislead or confuse a user to think that water filtration is still being performed.

In U.S. Patent Publication No. 2009/0236271 published for Eserkaln, et al., on Sep. 24, 2009, entitled, "MODULAR DRINKING WATER FILTRATION SYSTEM WITH LOCKING ARRANGEMENT TO ASSURE FILTER CARTRIDGE COMPATIBILITY," a modular filter system is taught using replaceable filter cartridges including a locking arrangement to prevent rotation of the flow control valve spindle in the filter head. The locking arrangement includes spring biased locking pins carried on the filter head and matching unlocking pins on the filter cartridge to operate through an intermediate adaptor ring that is set on assembly to match the positions of the locking and unlocking pins. A valve spindle is disposed on the outer housing for reciprocal rotary movement on the filter body axis between flow and no-flow positions, whereby connection and disconnection of the outer housing inlet opening and outlet opening with the cartridge inlet and outlet are provided. Rotation of the filter cartridge rotates a spindle (a form of rotary valve) from the no-flow position to the flow position. To remove the filter cartridge, the cartridge is turned in the opposite direction causing the spindle to rotate in the same direction to close the valve. Water flow is stopped, not bypassed, by this action. The spindle is an additional movable component, separate and distinct from the manifold.

Other water stoppage designs upon removal of the filter cartridge are taught in U.S. Pat. No. 7,056,436 issued to Stankowksi, et al., on Jun. 6, 2006, entitled "DISPOSABLE FLUID SEPARATION DEVICE AND MANIFOLD ASSEMBLY DESIGN WITH EASY CHANGE-OUT FEATURE," and U.S. Pat. No. 6,193,884 issued to Magnusson, et al., on Feb. 27, 2001, entitled "DRIPLESS PURIFICATION MANIFOLD AND CARTRIDGE." In both designs, water flow is stopped during cartridge removal; however, there is no bypass feature.

SUMMARY OF THE INVENTION

Bearing in mind the problems and deficiencies of the prior art, it is therefore an object of the present invention to provide a water filtration system having rotatably removable cartridges that sustains water flow during filter cartridge replacement.

It is another object of the present invention to provide a home water filtration system where the filter cartridges are designed for removal without water spillage, and without stopping water flow into the household during filter replacement.

A further object of the invention is to provide a home water filtration system that incorporates a dripless filter cartridge replacement design that minimizes moving components, and redirects water flow during cartridge replacement.

It is yet another object of the present invention to provide a water filtration system that eliminates a multi-component rotary valve and the need for an activation handle.

Still other objects and advantages of the invention will in part be obvious and will in part be apparent from the specification.

The above and other objects, which will be apparent to those skilled in the art, are achieved in the present invention which is directed to a filtration system having filtrate and bypass modes comprising: a filter cartridge assembly including: a filter media; a sump; a filter cap; a fastener; and an ingress port and an egress port extending from the filter cap and in fluid communication with the filter media; a mounting bracket having left and right sides with respective left and right fluid ports, the fluid ports in fluid communication with a manifold and with external fluid lines, the mounting bracket supporting the filter cartridge assembly and the manifold; the manifold in fluid communication with the filter cartridge assembly and the mounting bracket fluid ports, the manifold including at least first and second apertures on a left side, and corresponding at least first and second apertures on a right side, the manifold left and right side first apertures in fluid communication with the filter cartridge assembly ingress and egress ports, respectively, and with the mounting bracket fluid ports when the filtration system is in the filtrate mode whereby fluid flow traverses through the filter cartridge assembly, the manifold left and right second apertures in fluid communication with the mounting bracket fluid ports when the filtration system is in the bypass mode whereby fluid flow bypasses the filter cartridge assembly.

The filtration system includes having the manifold pivotally connected to the mounting bracket such that when the manifold is pivoted to a first position relative to the mounting bracket the filtration system is placed in the filtrate mode, and when the manifold is pivoted to a second position relative to the mounting bracket the filtration system is placed in the bypass mode.

The at least first and second apertures on the manifold left side may be adjacent one another, and the at least first and second apertures on the manifold right side may be adjacent one another. A circumferential resilient seal may be secured about the at least first and second apertures on the manifold left and right sides, respectively.

The first apertures on the manifold left and right sides are preferably positioned vertically higher than the second apertures, respectively, such that the first apertures are in fluid communication with the mounting bracket left and right fluid ports when the filter cartridge assembly longitudinal axis is vertical and the manifold is pivoted to the first position, whereby the filtration system is placed in the filtrate mode, and such that the second apertures are in fluid communication with the mounting bracket left and right fluid ports when the filter cartridge assembly longitudinal axis is rotated from vertical and the manifold is pivoted to the second position, whereby the filtration system is placed in the bypass mode.

The adjacent first and second apertures may comprise a kidney-shaped outer boundary.

The filtration system may further include curved support ledges on the left and right sides of the mounting bracket; and at least one cartridge boss on the sump. The mounting bracket curved support ledges are preferably in slidable contact with the at least one cartridge boss when the filtration system is placed in filtrate mode.

The manifold may include at least a left and right pivot boss in rotational contact with respective left and right pivot boss receivers on the mounting bracket left and right sides.

The filtration system may include at least one guide track—shoulder bolt combination on the manifold and the mounting bracket for slidably mating the manifold to the mounting bracket, the at least one guide track guiding the manifold pivoting from the first position to the second position.

A filter lid having a filter lid top surface adjacent to, and in contact with, the manifold, and a filter lid bottom surface adjacent to, and in contact with, atop surface of the filter cap may be employed. The filter lid may comprise at least one rib or groove formed on, or attached to, the filter lid bottom surface, and the filter cap comprising at least one corresponding groove or rib formed on, or attached to, the filter cap top surface, such that the bottom surface of the filter lid adjoins the top surface of the filter cap by mating the at least one rib and groove respectively.

The filter lid may include at least one extended shape or embedded shape formed on, or attached to, the filter lid bottom surface, and the filter cap may include at least one corresponding embedded shape or extending shape formed on, or attached to, the filter cap top surface, such that the bottom surface of the filter lid adjoins the top surface of the filter cap by mating the at least one extended and embedded shape respectively.

The filter lid may also include at least one rib or groove formed on, or attached to, the filter lid top surface, and the manifold having a bottom surface comprising at least one corresponding groove or rib formed on, or attached to, the manifold bottom surface, such that the top surface of the filter lid adjoins the bottom surface of the manifold by mating the at least one rib and groove respectively.

In a second aspect, the present invention is directed to a manifold for a filtration system comprising: a valve including a first and second aperture on a left side of the manifold, and a corresponding first and second aperture on a right side of the manifold, the first and second apertures on the manifold left side adjacent one another, and the first and second apertures on the manifold right side adjacent one another, the first apertures on the manifold left and right sides positioned vertically higher than the second apertures, respectively, such that the first apertures are in fluid communication with a mounting bracket left and right fluid ports when the manifold is pivoted to a first position, and the second apertures are in fluid communication with the mounting bracket left and right fluid ports when the manifold is pivoted to the second position; and at least one pivot to provide pivotable rotation for the manifold with respect to the mounting bracket.

The pivot may comprise at least one pivot boss or pivot boss receiver on the manifold in rotational contact with at least one complementary pivot boss receiver or pivot boss on the mounting bracket. Alternatively, the pivot may include at least one pivot pin or aperture to receive a pivot pin on the manifold in rotational contact with at least one complementary aperture or pivot pin on the mounting bracket.

The manifold may have a manifold bottom surface including a plurality of ribs or grooves for mating with a plurality of complementary grooves or ribs embedded within a filter lid top surface.

In a third aspect, the present invention is directed to a manifold-mounting bracket combination for securing a filter cartridge assembly, the combination comprising: the manifold including: a valve including a first and second aperture on a left side of the manifold, and a corresponding first and second aperture on a right side of the manifold, the first and second apertures on the manifold left side adjacent one another, and the first and second apertures on the manifold right side adjacent one another, the first apertures on the manifold left and right sides positioned vertically higher than the second apertures, respectively, such that the first apertures are in fluid communication with a mounting bracket left and right fluid ports when the manifold is pivoted to a first position, and the second apertures are in fluid communication with the mounting bracket left and right fluid ports when the manifold is pivoted to the second position; at least one pivot boss or pivot boss receiver; and at least one shoulder bolt or guide track; and the mounting bracket including: at least one pivot boss receiver or pivot boss in rotational contact with the at least one complementary pivot boss or pivot boss receiver on the manifold to provide pivotable rotation for the manifold; at least one guide track or shoulder bolt in slidable contact with the at least one complementary shoulder bolt or guide track on the manifold for slidably mating the manifold to the mounting bracket, the at least one guide track guiding the manifold pivoting from the first position to the second position.

In a fourth aspect, the present invention is directed to a replaceable filter comprising: a filter media; a filter cap comprising at least one identifying groove, rib, extended shape, or embedded shape formed on, or attached to, the filter cap top surface, such that a filter lid having at least one complementary rib, groove, embedded shape, or extended shape adjoins the top surface of the filter cap by mating the at least one rib, groove, extended shape, or embedded shape; a fastener; and an ingress port and an egress port extending from the filter cap and in fluid communication with the filter media.

In a fifth aspect, the present invention is directed to a replaceable filter comprising: a filter media; a filter cap; a fastener; an ingress port and an egress port extending from the filter cap and in fluid communication with the filter media; and a resilient filter cartridge enclosure encompassing the filter media, the filter cartridge enclosure having apertures to provide for permeability and depressurization.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-14 of the drawings in which like numerals refer to like features of the invention.

Currently, to replace a filter in a whole home filtration system the consumer must turn water off to the entire house. The water must be drained from the downstream pipes, or another valve that is located just after the filtration system must be turned off. Once the filtration system has been isolated from the water source, a special tool is used often to remove the housing that encases the filter. Before a new filter is replaced into the housing, the old filter must be removed from the housing along with any sediment in the sump. The new filter is placed into the housing once the housing has been cleaned. The housing is then hand secured to the manifold. All water valves are turned on again to verify proper assembly. Because the water lines were most likely drained, there may be an excessive amount of air in the water lines that has to be forced out.

The present invention is directed to a home water filtration system that accommodates a replaceable filter cartridge. The filtration system is generally placed on a water line upon entrance into a home in order to perform water filtration for the entire home. It is desirable to facilitate the removal and replacement of a filter cartridge without removing the water source or ceasing water flow to the house. The preferred embodiment emphasizes a minimal use of components including a one-piece manifold valve that may be integral with the manifold, activated by movement of the cartridge itself, and does not require additional components, such as a handle or rotary valve, to operate.

Figure 1:
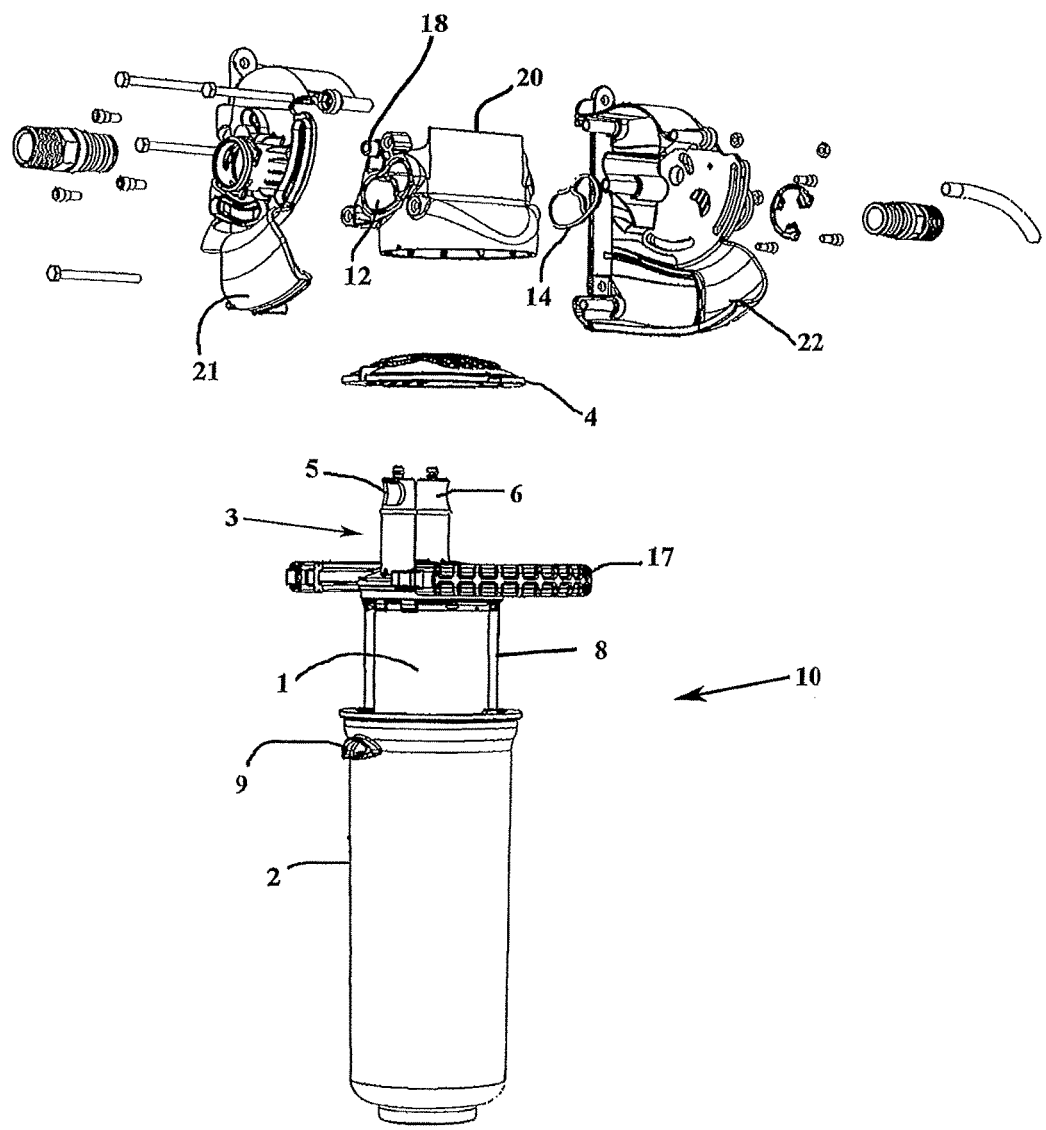
FIG. 1 is an exploded perspective view of the water filtration system with a manifold valve with an integrated bypass feature.
Figures 13A, 13B:
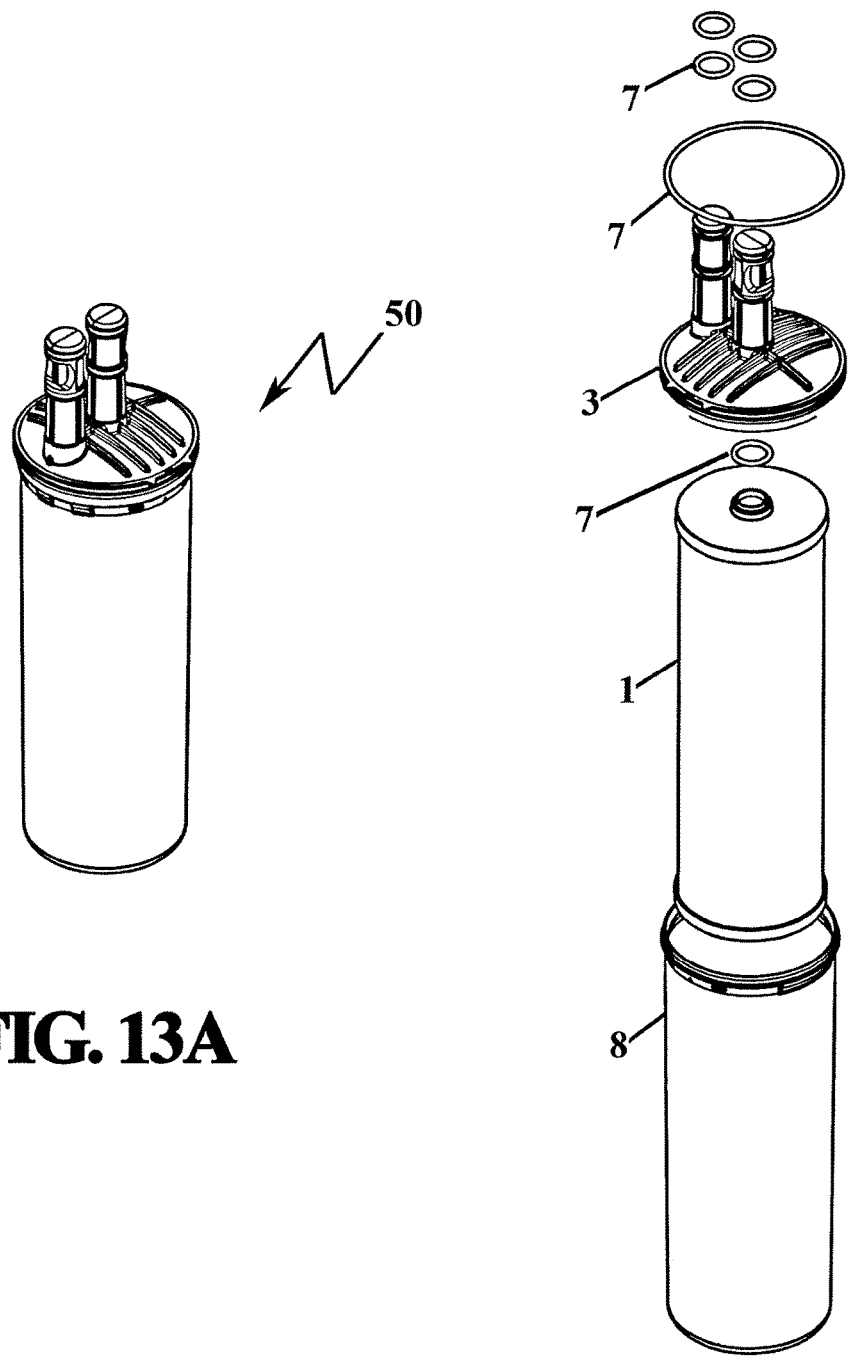
FIGS. 13A and 13B depict the replaceable filter assembly 50.

FIG. 1 is an exploded perspective view of the water filtration system with the manifold valve feature of the present invention. The water filtration system includes a filter cartridge assembly 10. Filter cartridge assembly 10 is a vessel adaptable for sustaining pressure, and includes a sump 2, a replaceable filter 50, a clamp or hoop strap 17, and a filter lid 4, all secured by clamp 17. Replaceable filter 50 is the assembly that the end user will replace as required. This assembly includes a filter media 1, for example a carbon block, encased by filter bag or cartridge enclosure 8, filter cap 3, and various associated O-rings 7. Ingress port 5 and egress port 6 extend from filter cap 3 and are in fluid communication with each other as well as with manifold 20. Clamp or hoop strap 17 secures replaceable filter 50 to filter lid 4 and sump 2. The replaceable filter 50 is depicted in FIG. 13A. FIG. 13B is an exploded view of the replaceable filter 50. Manifold 20 is rotatable with respect to left mounting bracket 21 and right mounting bracket 22 about left and right pivot bosses 18 that rotatably mate with mounting brackets 21, 22. Manifold 20 is preferably a one-piece swivel component rotatable about pivot bosses 18. Pivot bosses 18 are preferably supported by pivot boss receivers, preferably cylindrical depressions, in mounting brackets 21, 22. In an alternative embodiment, pivot bosses may be replaced with at least one pivot pin, and pivot boss receivers may be replaced with apertures or through-holes. These and other pivot configurations may be employed to ensure that the manifold is capable of pivoting with respect to the mounting brackets.

Dual apertures valves 12 are formed on pivotable manifold 20. This dual aperture design eliminates the need for a multi-component rotary valve that would otherwise employ internal rotatable parts. Furthermore, since only manifold 20 need be pivoted to redirect fluid flow, there is no longer any need for additional components, such as a handle, to activate the valve. With filter cartridge assembly 10 directly secured to manifold 20, the design allows the end user to simply lift the cartridge up, away from the vertical, which pivots manifold 20 about pivot bosses 18. This action repositions the integrated, dual aperture valves 12, and redirects the ingress fluid from one of the dual apertures to the other without the need for internal rotatable components in the design, and without the need for an activation handle to act on the internal rotatable components.

Filter cartridge assembly 10 is secured to manifold 20 by the left and right mounting brackets 21, 22. Mounting brackets 21, 22 secure a left side cartridge boss 9 and right side boss (not shown) on the top portion of sump 2. Each dual aperture, integrated manifold valve 12 is outlined by a resilient seal 14 to prevent fluid leakage during repositioning. Ingress port 5 and egress port 6 are aligned on respective sides of manifold 20 in fluid communication with respective ports of manifold valve 12 depending upon the desired direction of the fluid flow.

Figure 2:
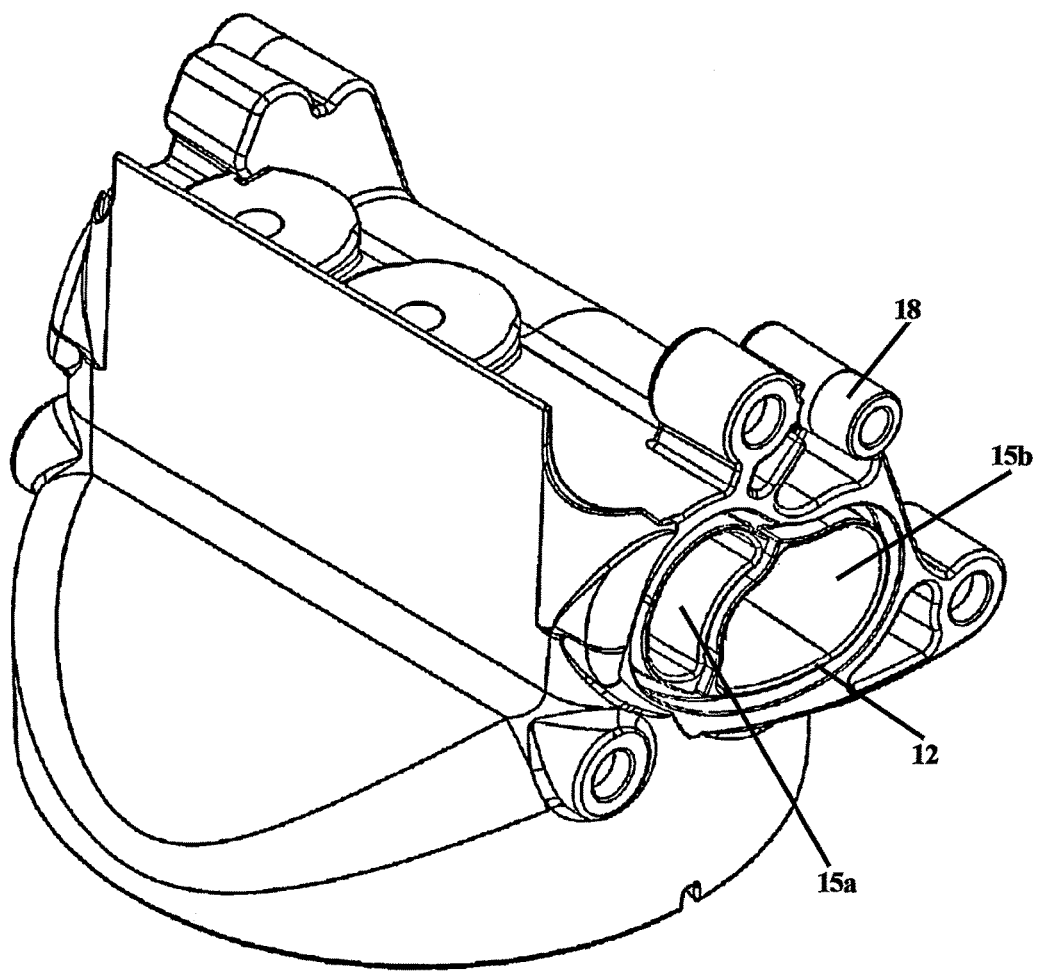
FIG. 2 is a perspective view of the manifold shown in FIG. 1.

FIG. 2 is a perspective view of manifold 20. Dual aperture, integrated valve 12 is configured as two separate and distinct upper and lower fluid portals, a filter port 15a, and a bypass port 15b, for directing water flow in one direction, to and from filter cartridge assembly 10, when the filtration system is in filtrate mode, and in a separate, alternate direction, bypassing filter cartridge assembly 10, when the filtration system is in service mode. In the preferred embodiment, the combined geometry of these dual apertures 12 form a kidney shape, but are not limited to any particular geometry. They are also preferably adjacent one another, separated by a thin wall, to allow for quick redirection of fluid flow with minimal leakage; however, the apertures may also be spaced apart provided fluid is not allowed to leak during the transition of fluid flow from one port to the other. The dual apertures are formed on, and preferably integral with, manifold 20. As discussed in further detail below, when filter cartridge assembly 10 is pivoted upwards and away from the vertical, the alignment of the ingress and egress water lines are directly connected to one another so that the fluid bypasses filter cartridge assembly 10, and flows directly into the home unfiltered.

Figure 3:
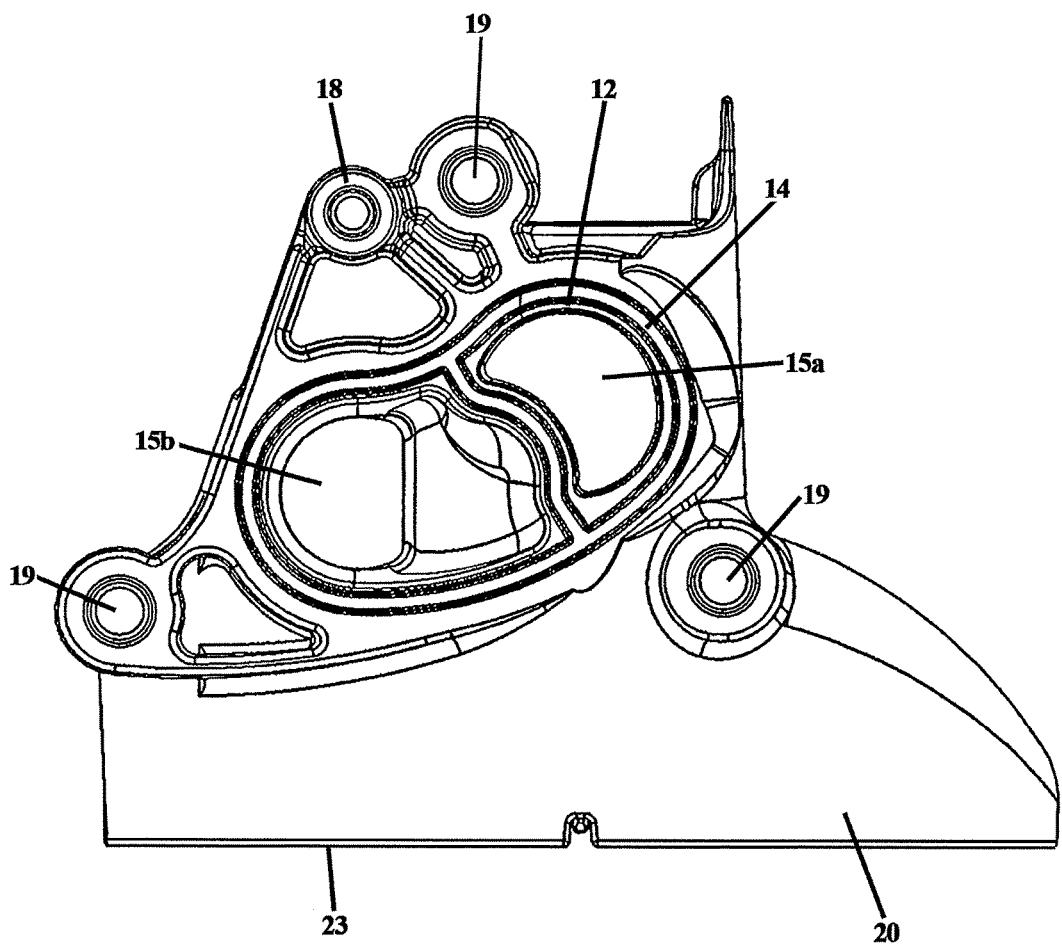
FIG. 3 is a left side view of the manifold of FIG. 2.
Figure 4:
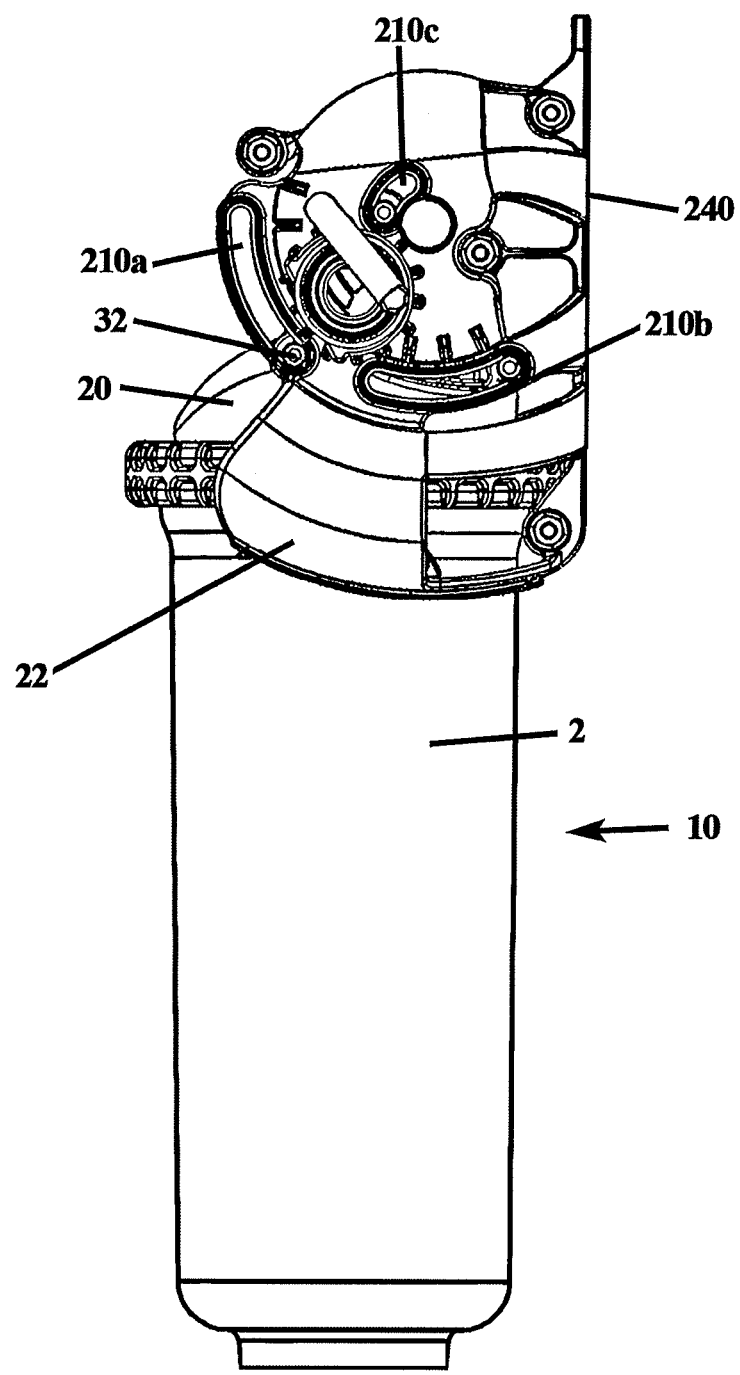
FIG. 4 depicts a preferred embodiment of the filtration system of the present invention configured in filtrate mode.

FIG. 3 is a left side view of manifold 20. Threaded holes 19 are formed at three locations on the manifold. Threaded holes 19 secure shoulder bolts 32 (refer: FIG. 4) that are slidably attached to arcuate guide tracks 210a,b,c in mounting brackets 21, 22. The bottom surface 23 of manifold 20 abuts filter cartridge assembly 10.

FIG. 4 depicts a preferred embodiment of the filtration system of the present invention configured in filter mode. Mounting brackets 21, 22 include a backside flat surface 240 with through-holes for attachment of the filtration system to a wall or other external mounting surface. During filtrate mode, the longitudinal axis of filter cartridge assembly 10 is aligned parallel to the plane of backside surface 240 of the supporting mounting brackets 21, 22. In this manner, filter cartridge assembly 10 is generally vertical in filtrate mode when mounting brackets 21, 22 are typically attached to a wall or other vertical support surface. Shoulder bolts 32 are shown at one end of each guide track 210a,b,c.

Figure 5:
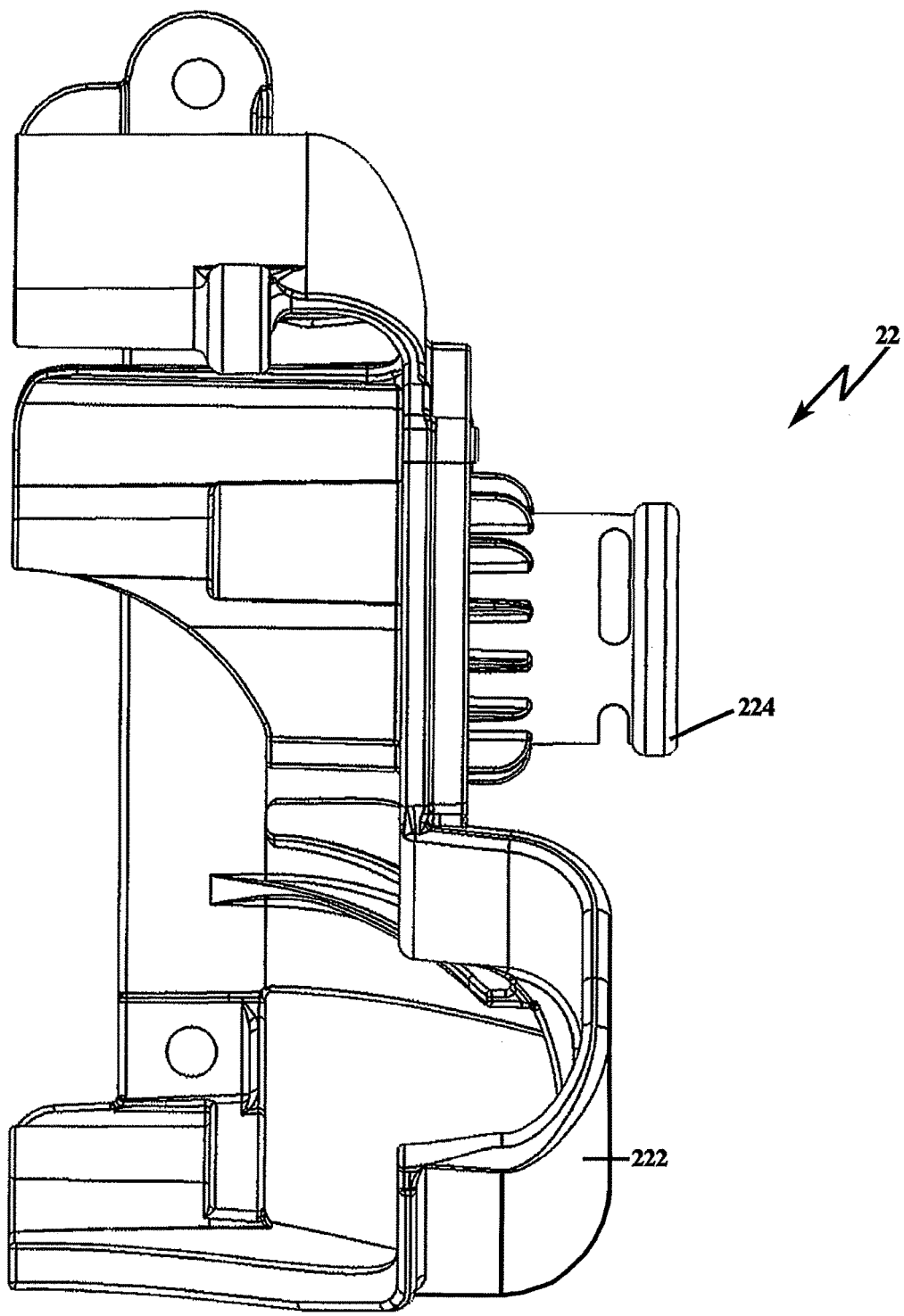
FIG. 5 is a front view of the right mounting bracket of FIG. 1.

FIG. 5 is a front view of right mounting bracket 22. Mounting brackets 21, 22 may be formed of discrete components. In a preferred embodiment, the mounting brackets are of a one-piece, integral construction, but may be employed in a multiple component design. Fluid port 224 extends laterally outwards for connection to an external fluid line (not shown). Curved support ledges 222 are formed on the lower portion of mounting brackets 21, 22. Ledges 222 support the cartridge bosses 9, which are subject to downward forces due in part to the weight of filter cartridge assembly 10 and residual fluid in the cartridge, and the fluid pressure when the filtration system is in filtrate mode. Ledges 222 are curved with a defined radius to allow for constant contact with cartridge bosses 9 when the rotating filter cartridge assembly 10 is rotated freely into position for filtrate mode. The resiliency of ledges 222 allows for a snug fit of filter cartridge assembly 10 when in filtrate mode. When the filtration system is put in service mode, filter cartridge assembly 10 is rotated away from the vertical axis, away from mounting brackets 21, 22, until cartridge bosses 9 are clear of each ledge 222 of respective mounting brackets 21, 22. At that point, the cartridge may be pulled away from manifold 20 and replaceable filter 50 exchanged.

Figure 6:
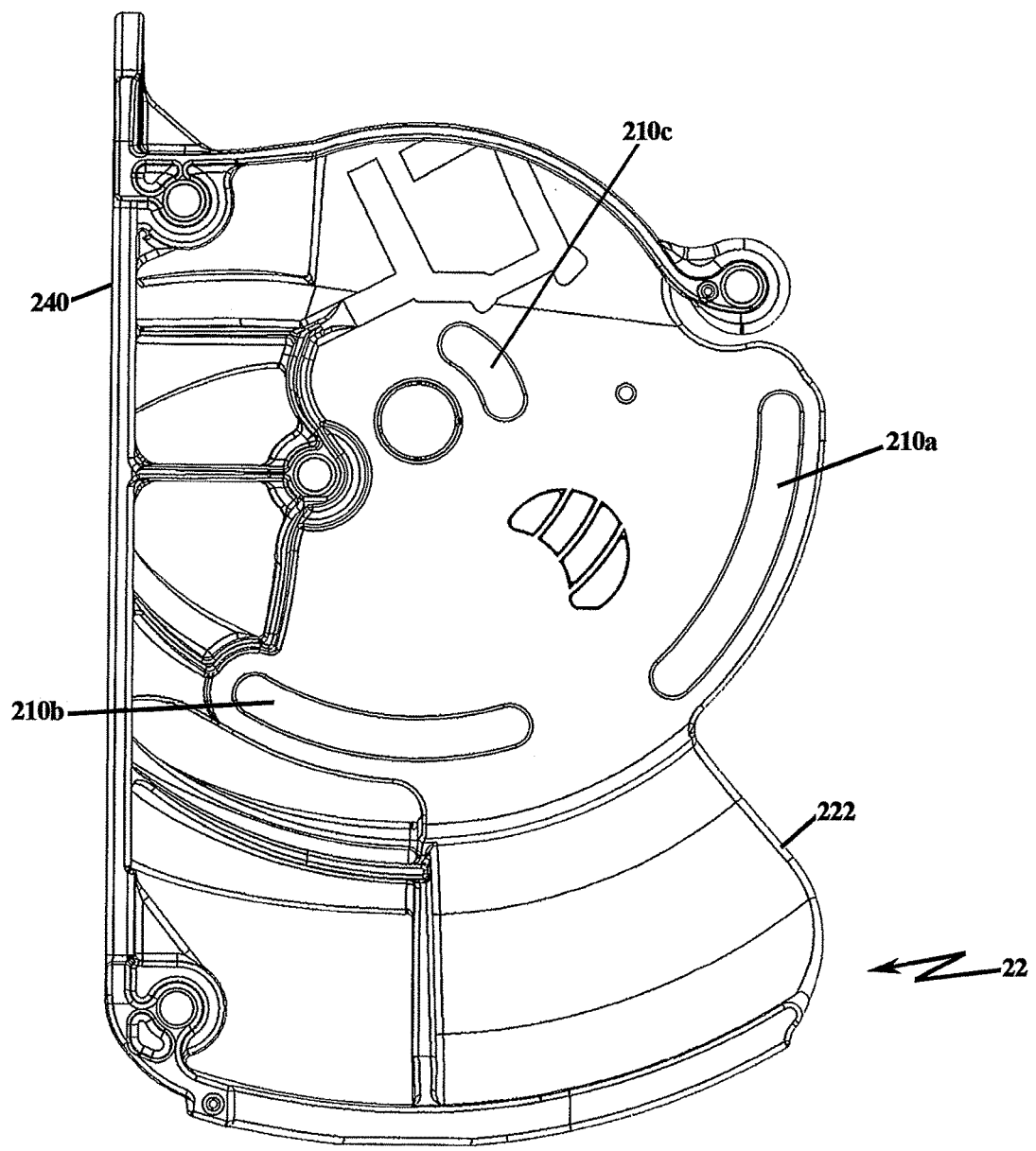
FIG. 6 depicts the inside face of the right mounting bracket of FIG. 5.

FIG. 6 depicts the inside face of right mounting bracket 22. In a similar fashion, left mounting bracket 21 is formed identical to right mounting bracket 22, with symmetrically reversed features. Mounting brackets 21, 22 include at least one arcuate guide track, and preferably three arcuate guide tracks 210a,b,c which preferably are integrally formed slots. Arcuate guide tracks 210a,b,c slidably receive respective shoulder bolts 32 attached on each side of manifold 20. Guide tracks 210a,b,c allow manifold 20 to slidably pivot from the vertical position where bottom surface 23 is perpendicular with the longitudinal axis of filter cartridge assembly 10, as shown in FIG. 4, to an angle off the vertical. Guide tracks 210a,b,c provide structural support during rotation for manifold 20, and ensure that the rotational stop points of manifold 20 are defined and coincide with placing filter cartridge assembly 10 in either filtrate mode or service mode.

Figure 7A:
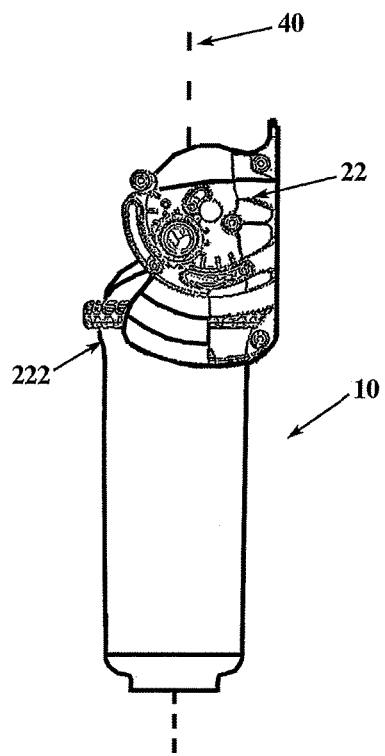
FIG. 7A depicts the positioning of the filter cartridge assembly when the filtration system is in filtrate mode.
Figure 7B:
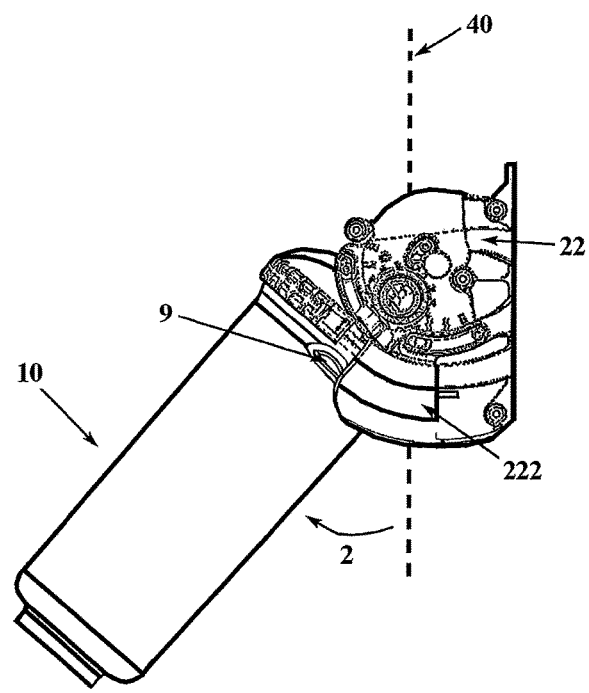
FIG. 7B depicts the positioning of the filter cartridge assembly when the filtration system is in service mode.

FIGS. 7A and 7B depict the positioning of filter cartridge 10 when the filtration system is in filtrate mode (FIG. 7A), and when the filtration system is in service mode (FIG. 7B). In FIG. 7A, filter cartridge assembly 10 longitudinal axis is in-line with the vertical axis 40. In FIG. 7B, filter cartridge assembly 10 is rotated about an angle q off vertical axis 40, such that bosses 9 are clear of ledges 222 to allow for cartridge removal. In this position, it is evident to an end user that the system is in bypass mode since filter cartridge assembly 10 is no longer vertical.

Figure 8:
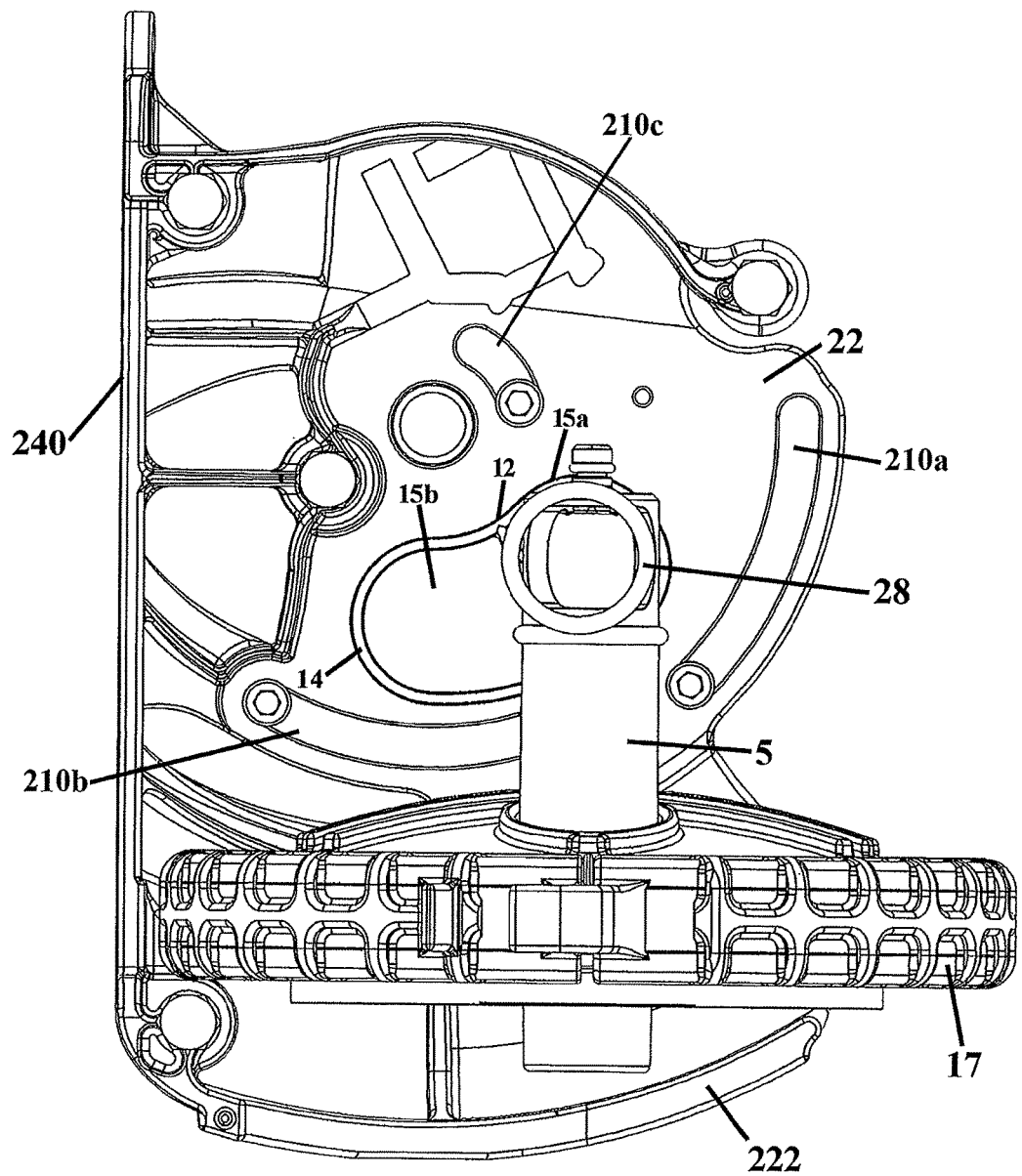
FIG. 8 is a cross-sectional, partially transparent view of the upper portion of the filtration system.

FIG. 8 is a cross-sectional, partially transparent view of the upper portion of the filtration system. The inside of right mounting bracket 22 is depicted showing the fluid connection to the ingress port 5 of filter cartridge assembly 10. In this figure, substantially all of mounting bracket 21 is transparent except for circular fluid portal 28, which is in fluid communication with the external fluid lines. Removed from this view is manifold 20 except for the dual aperture valve 12, in order to show the alignment of fluid portal 28 with the ingress port 5. In a similar alignment fashion, behind ingress port 5 is egress port 6 (not shown), which is in alignment with upper port 15a of kidney-shaped valve 12 on right mounting bracket 22. When in this position, filter cartridge assembly 10 is in filtrate mode. The ingress and egress ports 5, 6 of filter cartridge assembly 10 are vertical and in fluid communication with both upper ports 15a of manifold valves 12, and with fluid portals 28 on mounting brackets 21, 22.

Figure 9A:
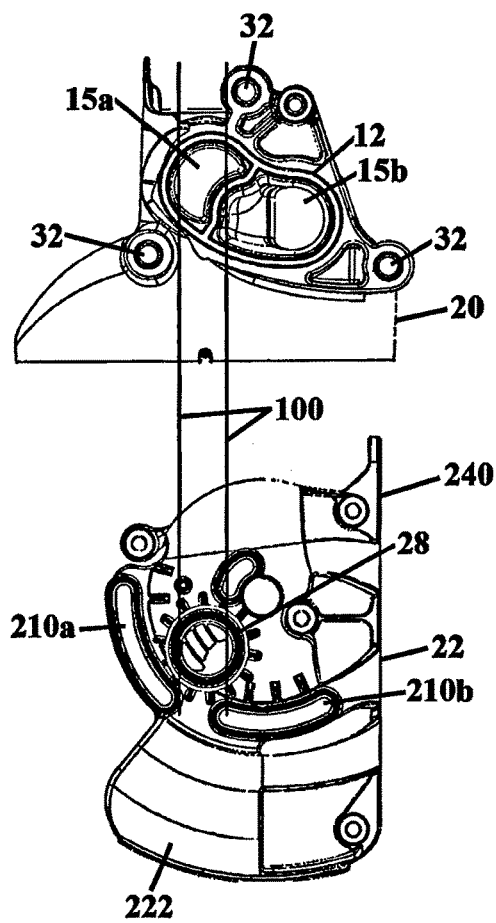
FIG. 9A is an exploded view illustrating the alignment of the fluid portal of the right mounting bracket with the filtration port of the integrated manifold valve when filter cartridge assembly is in filtrate mode.
Figure 9B:
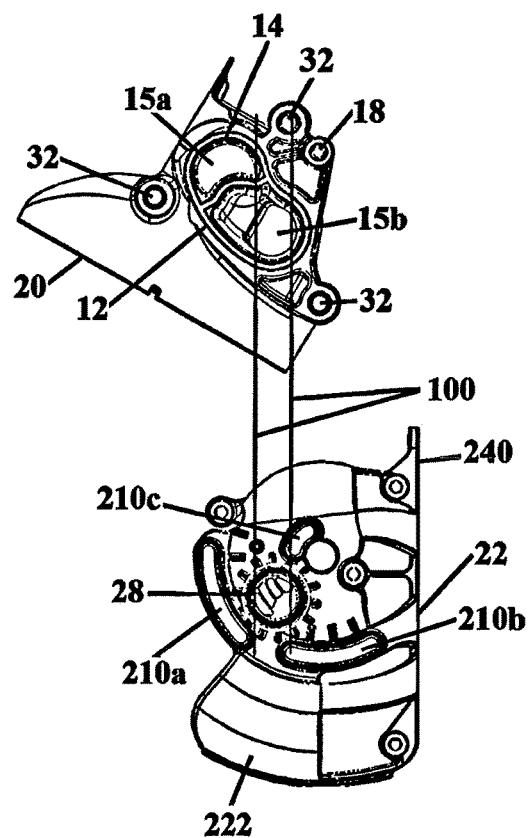
FIG. 9B is an exploded view illustrating the alignment of the fluid portal of the right mounting bracket with the bypass port of the integrated manifold valve when filter cartridge assembly is in service mode.

FIGS. 9A and 9B represent exploded views illustrating the alignment of fluid portal 28 of right mounting bracket 22 with the dual aperture, integrated manifold valves 12 of manifold 20 when filter cartridge assembly 10 is in filtrate mode (FIG. 9A), and when it is in service mode (FIG. 9B). Alignment lines 100 indicate the relative placement of manifold valve 12 with respect to fluid portal 28. Fluid portal 28 is in fluid communication with either the upper port 15a of manifold valve 12 for filtration purposes, or the lower portion 15b of manifold valve 12 for service purposes. When in service mode, manifold 20 is pivoted upwards as depicted in FIG. 9B, rotated away from the vertical axis. Shoulder bolts 32 of manifold 20 are slidably positioned within, and guided by, arcuate guide tracks 210a,b,c of mounting bracket 22. The fluid flow is redirected from upper (filter) port 15a of manifold valve 12 to lower (bypass) port 15b of manifold valve 12 without any leakage due to the sealing attributes of resilient seal 14, which seals the circumference of the upper and lower portions 15a,b of manifold valve 12. A single rotational movement of manifold 20 displaces upper port 15a of manifold valve 12 relative to fluid portal 28, that is, the pivoting of manifold 20 moves the manifold valves 12 relative to fluid portals 28 on mounting brackets 21, 22. Mounting brackets 21, 22 do not rotate. The manifold is the only rotational component of the filtration system responsible for directing fluid flow. As a consequence, the bypass feature of the present invention has no internal moving parts—the only pivoting movement is that of the manifold itself. There is no rotary valve. Consequently, any additional components necessary to activate a rotary valve, such as a handle, are not required. In the present invention, there are no internal rotatable components for a handle to govern. Since filter cartridge assembly 10 is attached to manifold 20, the rotation of manifold 20 to put the system in service mode may be easily initiated by simply moving filter cartridge assembly 10 upwards so that manifold 20 is as shown in FIG. 7B. This has the added benefit of signaling to the user that the cartridge is ready for replacement since it is no longer in the vertical operation position.

In the alignment positioning of FIG. 9A, the filtration system is in filtrate mode, and fluid from the fluid source is diverted through fluid portal 28, through upper filter port 15a of manifold valve port 12 on one side of manifold 20, to filter cartridge assembly 10 (not shown) before continuing its path back through the filter cartridge egress port, the corresponding upper filter port 15a of manifold valve port 12 on the opposite side of manifold 20, and into the home.

The built-in bypass feature allows fluid to flow into the home unfiltered during cartridge replacement. Upon replacement of filter cartridge assembly 10, one simply pivots the cartridge back to the vertical position, which realigns the upper filter ports 15a of manifold valve 12 with fluid portals 28. This new alignment places the filtration system back in filtrate mode.

Figure 10:
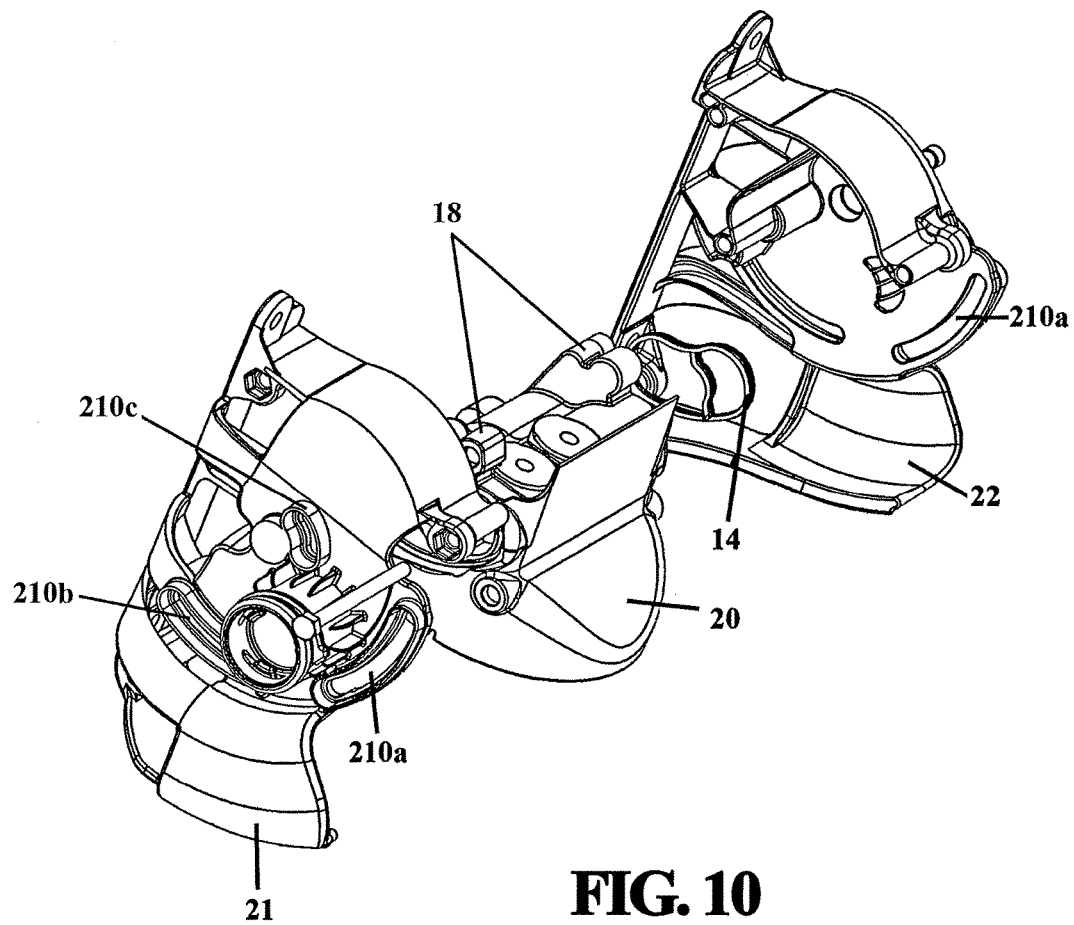
FIG. 10 depicts a perspective view of the placement of the manifold between the mounting brackets, and the positioning of a pivoting action about which the manifold rotates with respect to the mounting brackets.

FIG. 10 depicts a perspective view of the placement of manifold 20 between mounting brackets 21, 22, as well as the positioning of pivot bosses 18, about which manifold 20 rotates. The only moving part is the pivoting manifold 20, which significantly increases the reliability of the filtration system, and facilitates manufacturing.

An advantage of the filtration system of the present invention is the connection between the filter and the housing, and the ease of replacing the filter (no tools are needed to turn water valves off or to open the housing).

Importantly, the integrated manifold valve is specifically designed to be a dual aperture valve, such as the preferred kidney-shaped embodiment disclosed, although other dual aperture configurations are possible. The dual aperture design facilitates a rotational cut-off and redirection of fluid flow from the filter position to the replacement position after rotation. Circumferential seal 14 ensures that there is no leakage during the transition as fluid flows first into one aperture of the dual aperture (rotary) valve and then is redirected to flow into the other aperture. Thus, a dripless, rapid redirection of fluid flow is achieved in this manner. The adjacent location of the apertures of this dual aperture design makes for a seamless, dripless transfer of fluid redirection with a simple pivot of the aperture.

Figure 11:
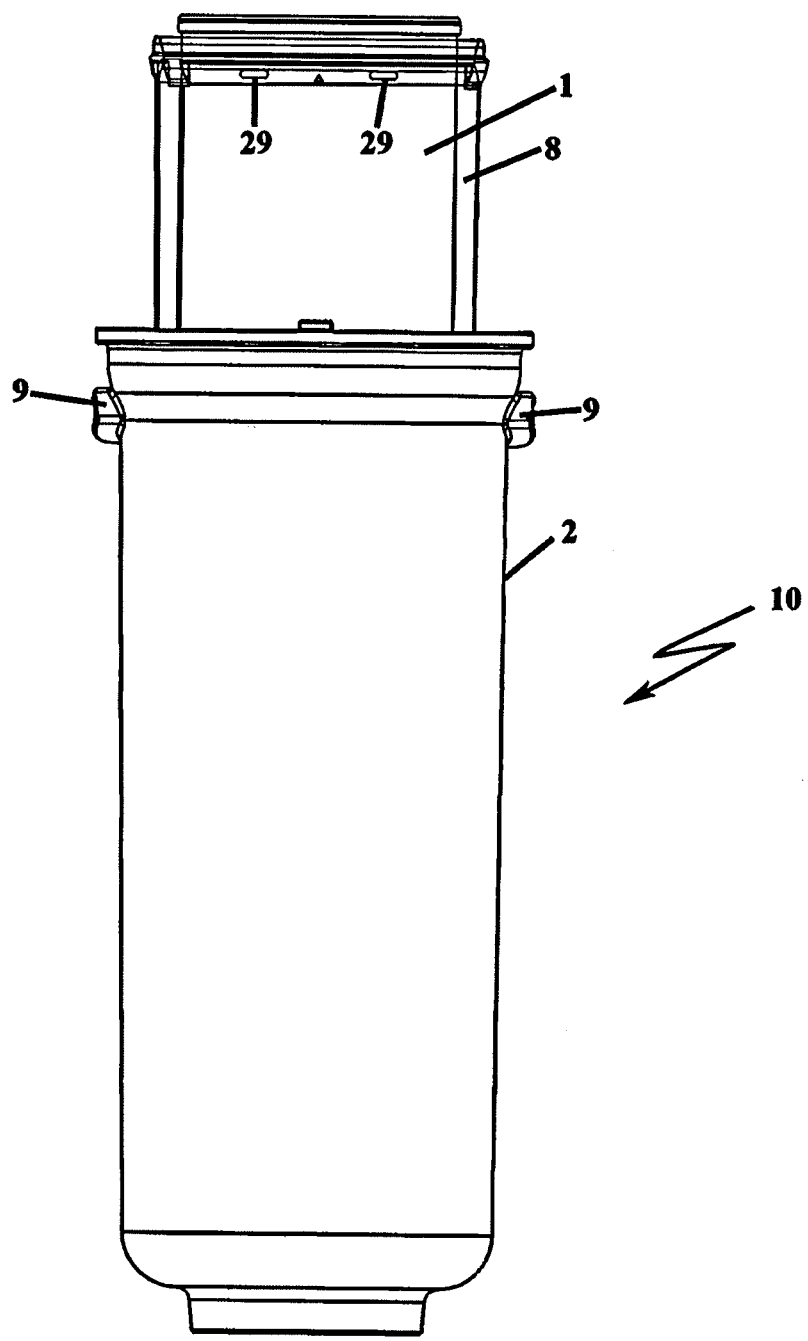
FIG. 11 depicts an exploded view of a portion of the filter cartridge assembly with the filter media encased in a filter bag or filter cartridge enclosure, both of which are insertable within the filter sump.
Figure 12:
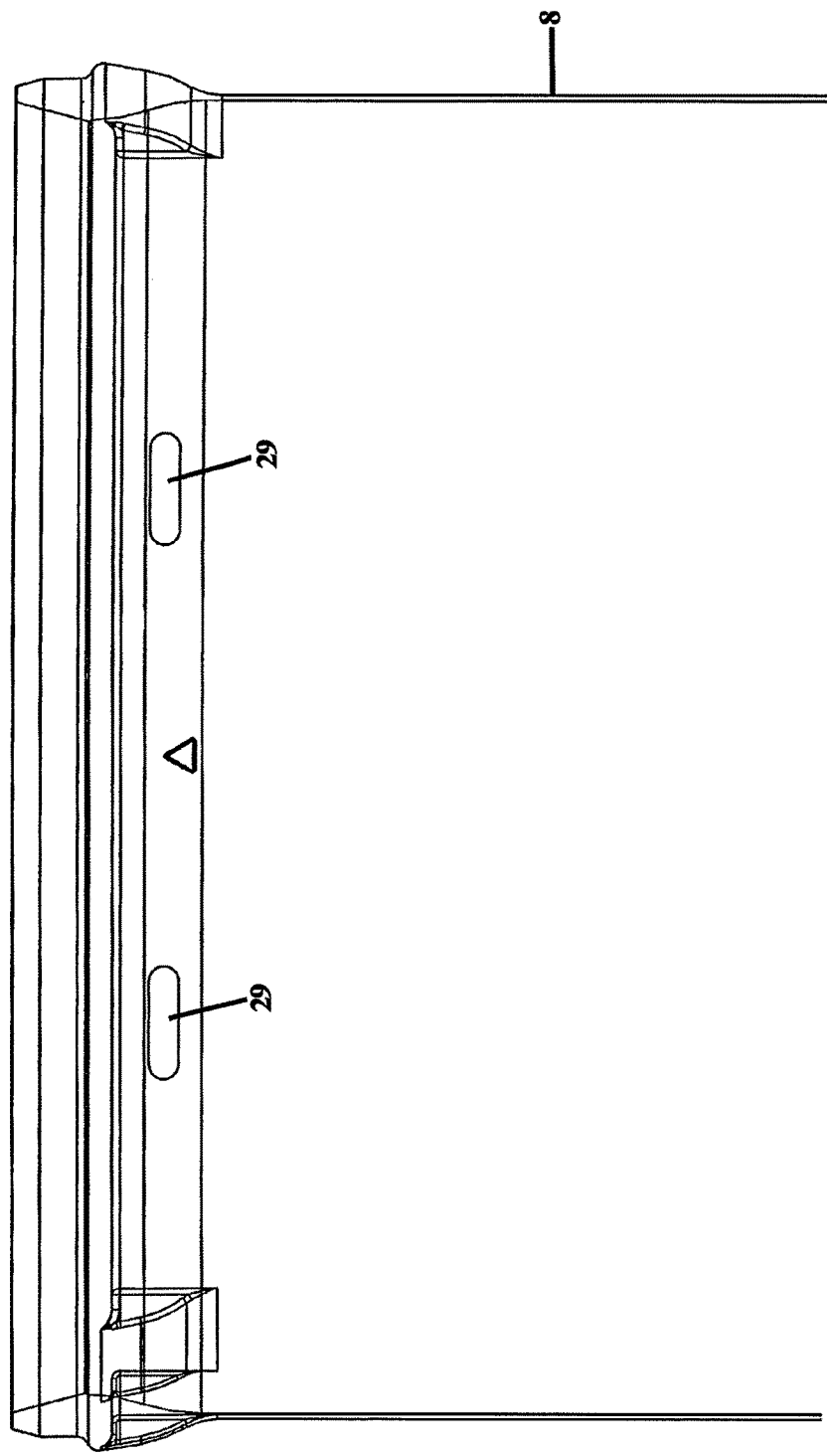
FIG. 12 depicts an exploded, side view of the top portion of the filter cartridge enclosure.

In some embodiments filter cartridge assembly 10 includes a flexible, permeable filter bag or cartridge enclosure 8, which encompasses filter media 1. This flexible material is preferably made of a polyethylene, or the like. FIG. 11 depicts an exploded view of a portion of filter cartridge assembly 10 with filter media 1 shown encased in filter bag 8, both of which are insertable within filter sump 2. FIG. 12 depicts an exploded, side view of the top portion of filter bag 8. Apertures or vent holes 29 are formed on filter bag 8, located near the top, make filter bag 8 permeable, and provide for limited fluid and gas flow during operation of the filtration system. By making the filter bag permeable, apertures 29 allow for de-pressurization when removing and replacing the filter cartridge assembly. The high placement of these apertures near the top of sump 2 also limits the amount of silt that would otherwise collect at the bottom of sump 2. If filter bag 8 is not made permeable by associated apertures 29, the pressurization of filter bag 8 would require the rigidness of filter sump 2 to ensure the filter bag's structural integrity, insomuch as the resilient nature of filter bag 8 would cause it to expand considerably under pressure without the support of sump 2. Apertures 29 ensure that this unwanted expansion will not occur. Without apertures 29, when replacing filter 50, filter bag 8 may establish a vacuum with the inside of sump 2, prohibiting an easy extraction.

Construction of filter cartridge assembly 10 includes pressing the filter cap onto a carbon block (filter media 1). Filter bag 8 is then preferably spin welded to the filter cap although other attachment means in the art may be employed. Sealing O-Rings 7 are then placed on the filter cap. Filter bag 8 and the filter cap 3 are both preferably made of HDPE material. Filter cap 3 is preferably thicker than filter bag 8 to increase strength. Filter cap 3 could be made of polypropylene (a slightly harder material) and still produce a good spin weld joint. FIGS. 13A and 13B depict the replaceable filter 50 of the present invention, which includes filter media 1, filter bag 8, and filter cap 3.

Figure 14:
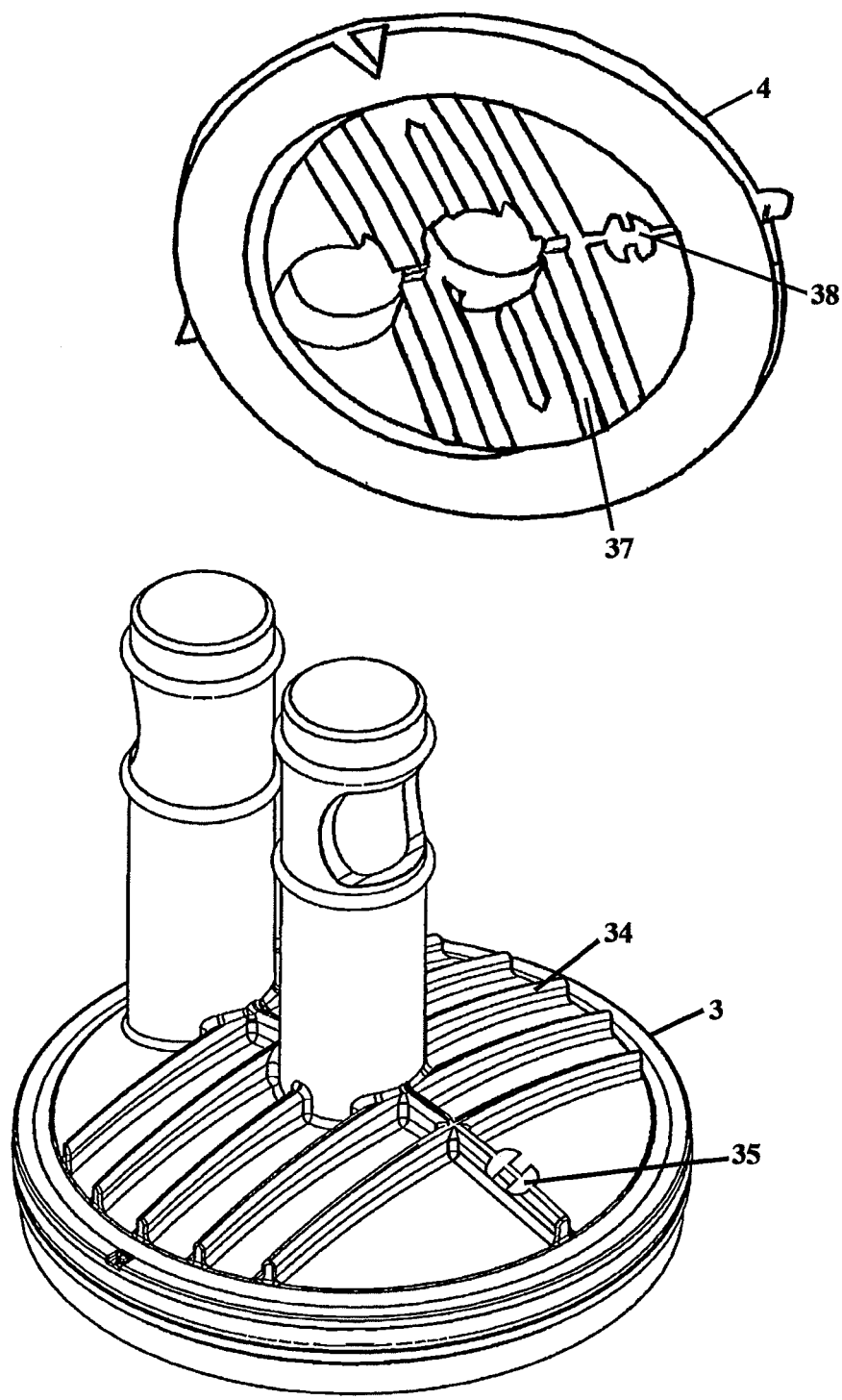
FIG. 14 depicts a filter cap top surface having extended ribs and an extended shape, and a filter lid bottom surface having grooves corresponding to the filter cap ribs, and an embedded shape corresponding to the filter cap extended shape.

In order to accommodate various user environments where different filters may be required for particular applications, and the replacement of one filter type with that of another is undesirable, in one embodiment of the present invention, the top surface of filter cap 3 and the adjoining bottom surface of filter lid 4 may include a plurality of ribs extending above the filter cap top surface and/or the filter lid bottom surface, and a plurality of corresponding grooves embedded within the filter cap top surface and/or the filter lid bottom surface for receiving the ribs. Any combination of ribs and corresponding grooves will permit the mating of only a particular filter cap with a corresponding filter lid, thus prohibiting unwanted filter replacements. In addition to a rib/groove mating structure, in another embodiment, extended and embedded shapes may be employed to perform the same replacement filter identification function. The rib/groove mating structure and the extended/embedded shape mating structure may be used alone or in combination. As an illustrative example, FIG. 14 depicts a filter cap 3 top surface having extended ribs 34 and an extended shape 35, and a filter lid 4 bottom surface having grooves 37 corresponding to ribs 34, and an embedded shape 38 corresponding to extended shape 35.

In an alternative embodiment, the top surface of filter lid 4 and the adjoining bottom side of manifold 20 may include a plurality of ribs extending above the filter lid top surface and/or the manifold bottom side surface, and a plurality of corresponding grooves embedded within the filter lid top surface and/or the manifold bottom side surface for receiving the ribs. Any combination of ribs and corresponding grooves will permit the mating of only a particular filter lid with a corresponding manifold, thus prohibiting undesired filter cartridge assembly replacements. In a similar manner to the filter cap/filter lid identification scheme, in another embodiment, extended and embedded shapes may be employed on the filter lid top surface/manifold bottom side surface to perform the same replacement filter identification function. The rib/groove mating structure and the extended/embedded shape mating structure may be used alone or in combination.

The present invention presents a filtration system with an integrated manifold valve 12. The filtration system employs only one pivotal component—the pivoting of the manifold 20. The manifold valve 12 includes a dual aperture design for a two-fold alignment scheme with the ingress and egress lines of the fluid source. Importantly, the invention does not require a multi-component rotary valve with internal, rotatable parts, or an activation component, such as a handle, for initiating the rotary valve, allowing the user to rotate the rotational components thereof. The reduction in moveable components in this design reduces the likelihood of failure and increases the reliability of the filtration system.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A manifold for a filtration system comprising:
a valve including a first and second aperture on a left side of said manifold, and a corresponding first and second aperture on a right side of said manifold, said first and second apertures on said manifold left side adjacent one another, and said first and second apertures on said manifold right side adjacent one another, at least a portion of said first aperture on said manifold left positioned vertically higher than said second aperture on said manifold left side, at least a portion of said first aperture on said manifold right side positioned vertically higher than said second aperture on said manifold right side, such that said first apertures are in fluid communication with a mounting bracket left and right fluid ports when said manifold is pivoted to a first position, and said second apertures are in fluid communication with said mounting bracket left and right fluid ports when said manifold is pivoted to said second position; and
at least one pivot to provide pivotable rotation for said manifold with respect to said mounting bracket.

2. The manifold of claim 1 including a circumferential resilient seal about said first and second apertures on said manifold left, and a circumferential resilient seal about said first and second apertures on said manifold right side.

3. The manifold of claim 2 wherein said adjacent first and second apertures comprise a kidney-shaped outer boundary.

4. The manifold of claim 1 wherein said pivot includes at least one pivot boss or pivot boss receiver on said manifold in rotational contact with at least one complementary pivot boss receiver or pivot boss on said mounting bracket.

5. The manifold of claim 1 wherein said pivot includes at least one pivot pin or aperture to receive a pivot pin on said manifold in rotational contact with at least one complementary aperture or pivot pin on said mounting bracket.

6. The manifold of claim 1 having a manifold bottom surface including a plurality of ribs or grooves for mating with a plurality of complementary grooves or ribs embedded within a filter lid top surface.

7. A manifold-mounting bracket combination for securing a filter cartridge assembly, said combination comprising:
   said manifold including:
      a valve including a first and second aperture on a left side of said manifold, and a corresponding first and second aperture on a right side of said manifold, said first and second apertures on said manifold left side adjacent one another, and said first and second apertures on said manifold right side adjacent one another, at least a portion of said first aperture on said manifold left positioned vertically higher than said second aperture on said manifold left side, at least a portion of said first aperture on said manifold right side positioned vertically higher than said second aperture on said manifold right side, such that said first apertures are in fluid communication with a mounting bracket left and right fluid ports when said manifold is pivoted to a first position, and said second apertures are in fluid communication with said mounting bracket left and right fluid ports when said manifold is pivoted to said second position;
   at least one pivot boss or pivot boss receiver; and
   at least one shoulder bolt or guide track; and
   said mounting bracket including:
      at least one pivot boss receiver or pivot boss in rotational contact with said at least one complementary pivot boss or pivot boss receiver on said manifold to provide pivotable rotation for said manifold;
      at least one guide track or shoulder bolt in slidable contact with said at least one complementary shoulder bolt or guide track on said manifold for slidably mating said manifold to said mounting bracket, said at least one guide track guiding said manifold pivoting from said first position to said second position.

* * * * *